United States Patent [19]

Ward, Jr.

[11] 3,992,841

[45] Nov. 23, 1976

[54] PANEL CONSTRUCTION AND PROJECTION SCREEN CONSTRUCTED FROM SUCH PANELS

[76] Inventor: Robertson Ward, Jr., 21 W. Elm St., Chicago, Ill. 60610

[22] Filed: Aug. 30, 1974

[21] Appl. No.: 502,157

[52] U.S. Cl. .............................. 52/309; 52/81; 52/528; 52/578; 52/622; 156/258; 350/117; 350/125

[51] Int. Cl.² ..................... E04C 1/24; E04B 1/342

[58] Field of Search ............. 52/578, 581, 589, 590, 52/592, 528, 560, 622, 592, 631, 309; 350/117, 125; 156/258

[56] References Cited

UNITED STATES PATENTS

| | | | |
|---|---|---|---|
| 1,128,867 | 2/1915 | Genter | 350/129 |
| 1,156,753 | 10/1915 | Carey | 52/593 |
| 2,273,074 | 2/1942 | Wallen | 350/129 X |
| 2,276,071 | 3/1942 | Scull | 52/592 |
| 2,431,035 | 11/1947 | Goepfert et al. | 156/258 X |
| 2,710,276 | 6/1955 | Mottet et al. | 156/258 X |
| 2,753,818 | 7/1956 | Green | 350/125 X |
| 2,758,044 | 8/1956 | Terry | 52/592 |
| 2,872,712 | 2/1959 | Brown et al. | 52/578 |
| 3,237,517 | 3/1966 | Komitor | 350/125 |
| 3,251,264 | 5/1966 | Jacobson | 350/117 X |
| 3,420,605 | 1/1969 | Kipping | 350/125 X |
| 3,449,186 | 6/1969 | Rano | 156/258 X |
| 3,507,548 | 4/1970 | Hoffmann et al. | 350/117 |
| 3,632,185 | 1/1972 | Meanor | 350/125 |
| 3,637,359 | 1/1972 | Malloy et al. | 156/258 X |
| 3,686,061 | 8/1972 | Brown et al. | 156/258 X |
| 3,851,950 | 12/1974 | Andres | 350/125 |

FOREIGN PATENTS OR APPLICATIONS

| | | | |
|---|---|---|---|
| 511,001 | 5/1952 | Belgium | 156/258 |
| 62,632 | 6/1955 | France | 52/592 |
| 1,107,924 | 1/1966 | France | 350/117 |
| 885,780 | 8/1953 | Germany | 350/129 |
| 506,078 | 12/1954 | Italy | 350/117 |
| 6,631 | 3/1898 | United Kingdom | 52/592 |
| 1,047,088 | 11/1966 | United Kingdom | 350/125 |

Primary Examiner—Price C. Faw, Jr.
Assistant Examiner—Leslie Braun
Attorney, Agent, or Firm—Norman Lettvin

[57] ABSTRACT

Large projection screens, of which planetarium domes are typical, may conveniently be made up of a plural of prefinished panels, at least one edge of at least some of which panels overlaps another panel in a lap joint construction so that edges of the panels have a minimal effect upon light directed upon the screen from any angle. Panel edges overlapping another panel are tapered from a generally uniform thickness to substantially reduced thickness at the edge in a relatively short distance compared to panel dimensions and made to conform to and lay against the other panel. The panels are preferably made by a method which may involve either first shaping or finishing the projection surface of the dome panel. Each edge which will overlap another panel is then chamfered on the surface opposite the finished surface to form the taper. Finally the chamfered edge is deformed so that it will lay against and conform to the panel which it overlaps.

11 Claims, 22 Drawing Figures

PANEL CONSTRUCTION AND PROJECTION SCREEN CONSTRUCTED FROM SUCH PANELS

The present invention relates to a projection screen, which includes planetarium domes, comprising in part of plurality of panels, at least some of which overlap other panels in a novel lap joint construction. The present invention also concerns panels for such a screen and a method whereby such panels may be formed of prefinished panels without damaging the finish.

Projection screen domes have grown increasingly to greater size and some such as planetarium domes are of complex form. Such screens are composed of a great many panels which may involve many joints. In planetarium domes sheet metal panels are perforated, preformed and shaped to fit together to form a dome which may be self-supporting or more usually supported on a suitable outside frame. The exact nature of the support or frame for the projection screen employed is not of material importance in connection with the present invention which is concerned with the appearance of the projection surface. Because such a screen has to be formed of a plurality of panels, the joints between the panels are clearly visible unless disguised in some way.

A planetarium dome will be considered in particular, since it offers some severe problems related to the invention and it has been subject to considerable activity. If the joints are relatively tight so that the dome screen gives the appearance of being essentially continuous, it is usually quite satisfactory for a night-time simulation in which the stars and planets are projected on the interior surface of the dome. However, when the planetarium lights are turned up the joints become noticeable and in situations where the dome is used for other types of projection, some involving intensive illumination, the joints become a serious problem, casting shadows or reflecting unevenly the light that is projected upon them. Consequently, in the past various attempts have been made to conceal the joints which ordinarily have been either flanged butt joints or lap joints.

Butt joints have been considered by some to be better in appearance, and less obvious, than lap joints but are subject to much more severe tolerance problems in constructing a screen. Nevertheless, they have been often used and attempts have been made to better conceal them. One attempt to conceal butt joints between screen panels in planetariums was the use of a metal strip perforated like the dome panels to overlay the joint. Several means of holding such a strip in position have been suggested. For example, U.S. Pat. No. 3,594,964 suggested a strip T-shaped in cross-section wherein the cross piece was perforated and the vertical tang clamped between the panel flanges. The problem of putting a strip in place and holding it there has been severe and have made the construction of a dome screen much too complicated. Moreover, holes in the strips usually did not coincide with holes in the panel beneath so that such strips have presented areas of greater whiteness than the rest of the dome panels because of the painted surfaces behind the holes in the strips were seen through the holes in the strips. Furthermore, the edges of the strips themselves have provided discontinuities which produce shadows on one side and highlights on the other with light that is not directed perpendicularly to the dome surface.

An improvement over the perforated metal strips was the use of vinyl or other suitable tape of the color of the dome printed with black dots in a similar pattern of distribution as the holes in the panels which were covered. Such strips were more easily applied but often did not adhere well to the dome panels and in use had different reflective properties from the panels themselves despite good matches in color and dot pattern. Such strips have been limited in general to use with screens employing butt joints. Of course, non-perforated screens may have their panel joints taped with plain tape to the same effect.

Lap joints are generally considered easier to assemble because they offer fewer tolerance problems, but their joints have frequently been considered more obvious and less attractive than butt joints, in addition to a step discontinuity at the edge of a lap joint in prefinished panels, the white of the panel beneath shown through perforations of the overlapping panel and produced a whiter stripe than the rest of the screen. An improvement in lap joints was insertion of a strip of black material beneath the overlapping edge of the lap joint so that the panel underneath could not be seen through the holes of the overlapping portion. It is possible to use black strips of this type under a perforated metal strip cover in butt joints as well. However, there are twice as many edges to contend with as in a lap joint construction.

Any edge producing a step or sharp discontinuity in screen surface produces shadows or highlights, depending on the direction of light incident on the particular area of the dome. Certain modern theatrical techniques used in planetariums have made any visibility of sheet edges increasingly objectionable and projection screen techniques in general are becoming more demanding. In an effort to meet such demands, overlapping edges of screen panels have been tapered by cutting away material from the front surface of the panel. However, such procedures have been unsatisfactory where prefinished panels are employed since the edges have had to be repainted. Often such repainting must be done by hand, frequently after the screen is installed. In almost all cases where the screen has been prefinished, matching of the color and reflectance of the original finish is impossible.

The present invention is directed to a prefinished panel for a projection screen having tapered edges at those edges which are intended to overlap other panels. The tapering is preferably done by chamfering the back opposite the finish screen surface after a finished coating has been applied to the inside or screen surface. This is of particular importance today where special continuous coatings, such as vinyl coatings, are often applied as panel material, such as sheet metal, is manufactured and even before being cut into panels. After chamfering, the chamfered edge is deformed until it will lay against and conform to the panel which it overlaps, whereby the substantially reduced thickness will hardly be visible and will not be objectionable. In planetarium domes and other screens using perforated surfaces the present invention may be used in combination with a black strip backing to prevent the overlapped panel from being seen through holes in the panel.

More specifically the present invention concerns a prefinished panel construction for a projection screen employing lap joints between adjacent panels. The panels have a continuous uniform finish suitable for projection over the entirety of one of the faces and are of generally uniform thickness and such size as to overlap at least one adjacent panel. The taper is provided along at least one edge intended to overlap an adjacent panel whereby panel thickness at an adjacent edge is substantially reduced in the taper from the said uniform thickness to the edge in a relatively short thickness. When the tapered edge is formed so that it will conform to and lay against the panel it is intended to overlap.

The projection screen is comprised in part of a plurality of such panels, some of which have edges which overlap other panels in a lap-joint construction which is described. The projection screen may be a hollow dome for a planetarium. The present invention also relates to a method of making a panel for a projection screen from a sheet of material having a prefinished projection screen surface. In this method each edge of a panel intended to overlap an adjacent panel is chamfered on the surface opposite the prefinished surface to form a tapered edge. Then, the tapered edge is deformed so that it will lay against and conform to the panel which it overlaps whereby a substantially reduced edge thickness will hardly be visible.

For better understanding of the present invention reference is made to the drawings in which:

FIGS. 11A through 14A show several different forms which edge chamfering may take in accordance with the present invention; and FIGS. 11B to 14B show shapes which a deformed edge may take using the different types of chamfering shown in the corresponding numbered drawing FIGS. 11A through 14A.

Figure 1:
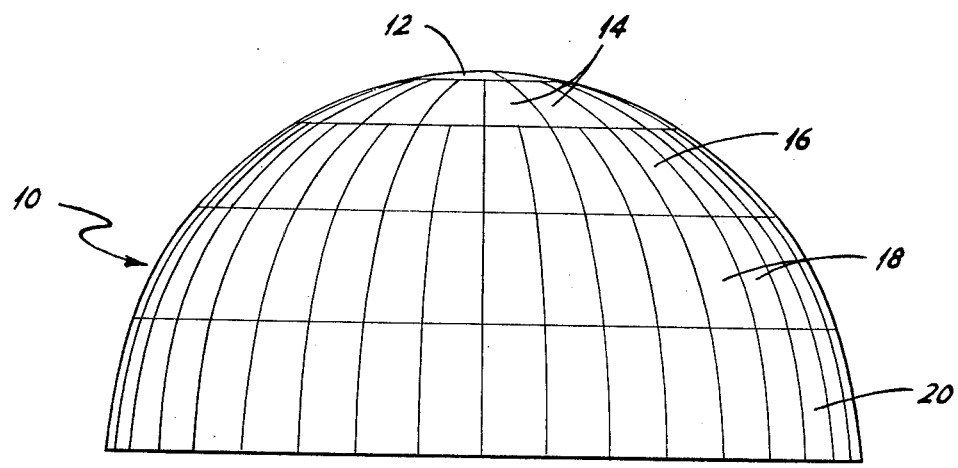
FIG. 1 is a side elevational cross-section view of a projection screen in the form of a planetarium dome which may embody the invention.
Figure 2:
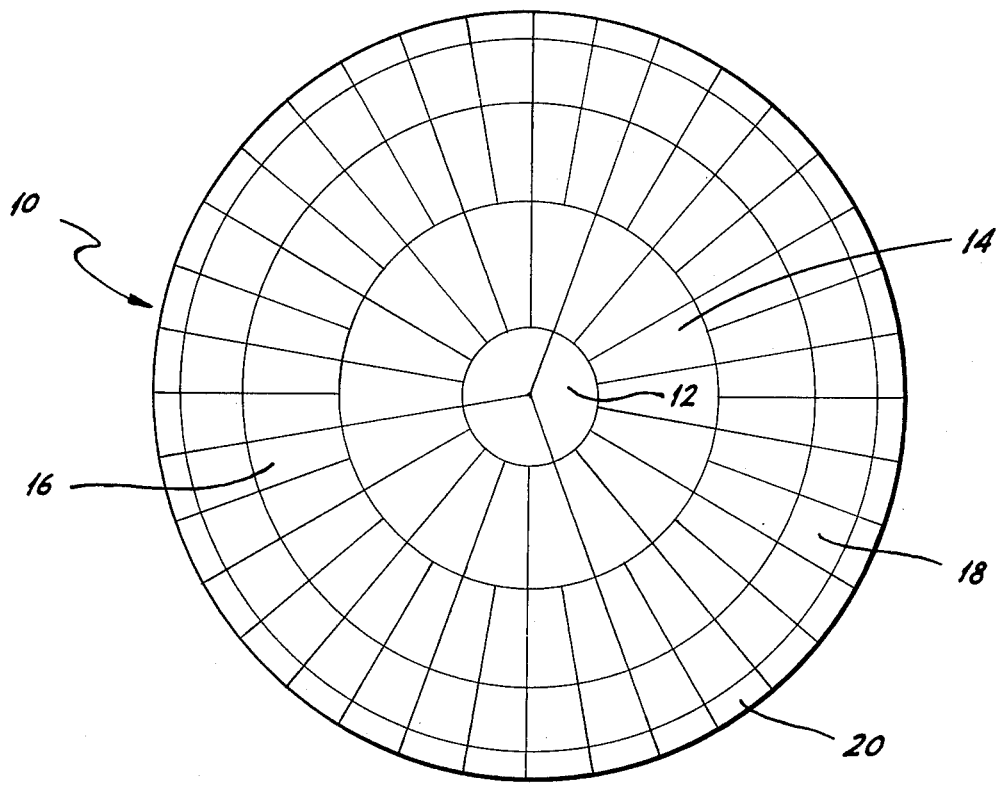
FIG. 2 is a plan view of the screen of FIG. 1 from below looking up into the dome.

As schematically indicated in FIGS. 1 and 2 the views selected are intended to convey the interior appearance of a planetarium dome screen. Such a screen is a relatively complex form of screen but one of those to which the present invention is applicable in addition to planar and curved screens of other types. The structure for supporting a screen such as shown in FIGS. 1 and 2 may be considerably varied but such structures exist in planetariums throughout the United States. The significant thing about FIGS. 1 and 2 in connection with the present invention is that the interior surface of planetarium dome generally designated 10 forms a screen composed of a plurality of panels which must be fitted together and involve many joints or seams. At the top of the dome, for example, there may be three spherically dished segment panels 12 which fit together in a circular configuration to form the apex of the dome. Beneath these is a circular row of spherically dished, generally trapezoidal panels 14. A lower circular row of panels 16 increases the number of panels employed. Beneath panels 16 lies a further circular row of panels 18, and, beneath that, still another circular row of panels 20. The dome construction illustrated is not in any sense intended to be by way of limitation. It is simply to give an impression of a typical hemispherical dome in which many panels are employed, and it will be understood that there are many variations of the forms of domes, including many different shapes of domes, some of which are not truly hemispherical in form throughout the dome, some of which are more or less of a sphere than a hemisphere, and some of which are tilted from the vertical. Of course, many other dome variations occur and are intended to be included where the invention is applicable. Whatever the form of the screen, and no matter how panels are supported, if they employ lap joints with other panels, the present invention may be employed.

Typically planetarium domes have been composed of pre-cut sheet metal perforated to a particular pattern of holes of a standarized size, shaped over a form, which may be used for other panels of the same shape and size, such as, for example, panels in a common circular row in the dome of FIGS. 1 and 2. The interior of such panels in a typical modern dome installation are prefinished usually using a white, or some other light, highly reflective colored coating which has a suitable texture for a projection screen. In recent years instead of paints coatings of materials such as polyvinyl chloride have been laminated onto the base metal which has typically been aluminum. While such laminating when done in manufacturing panel material makes the invention particularly significant, the invention may also be applied to panels which are painted or otherwise finished with a suitable coating after panel fabrication.

Figure 3A:
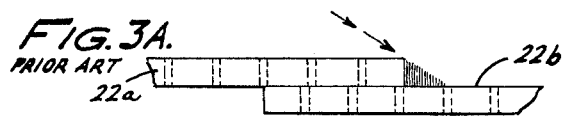
FIG. 3A is a fragmentary cross-sectional detail view of prior art lap joint diagrammatically illustrating the effect of incident light coming from the upper left.
Figure 3B:
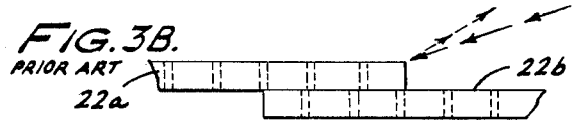
FIG. 3B is the same structure shown in FIG. 3A wherein incident light is diagrammatically shown as coming from the upper right.

FIGS. 3A and 3B are diagrammatic views to show what happens in a typical prior art dome lap joint employing panels 22a and 22b, only the overlapped edges of which are shown. Where light impinges the joint perpendicularly to the joint, there is a minimum problem with the edge of the overlapping panel 22a being noticeable. However, if the light comes from another direction, shadows or highlights increase the prominence of the joint. FIG. 3A shows how shadows can occur if light comes from the direction shown relative to the overlapped panels. FIG. 3B shows the same joint of the two panels 22a and 22b with light coming from the other direction so that there is no shadow but a direct reflection from the stepped edge becomes highly noticeable because of the discontinuity in light reflectance properties, even assuming similar finishing of all parts of the stepped joint which may not be possible.

Figure 4:
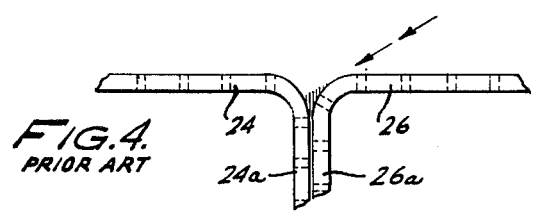
FIG. 4 is a similar diagrammatic showing of a flanged butt joint in which incident light comes from the upper right.

FIG. 4 shows conventional butt joint panels 24 and 26 have integral flanges 24a and 26a which are perpendicular to the joint turned away from the screen surface and fastened together in order to hold the panels in place. Typically, light not perpendicularly incident to such a joint produces a shadow as shown.

Figure 5:
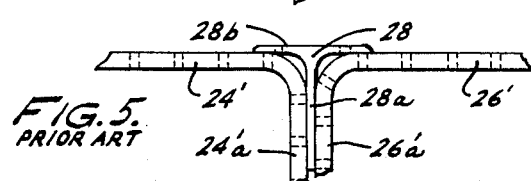
FIG. 5 is a fragmentary cross-sectional view of one type of construction intended to hide a butt joint.

FIG. 5 shows one solution as proposed by U.S. Pat. No. 3,594,964 wherein a T-shaped member 28 is inserted between the flanges 24a' and 26a', as shown, with the tang 28a of the T fitting between the flanges. Perforated cross web 28b of the T covers the joint and extends to the panels surfaces 24' and 26'. However, it will be noted that even if cross piece 28b is made relatively thinner, it still must have some thickness in order to be reasonably handled. In any event it is a very awkward type of construction to employ. As a consequence, in some structures of this type, the tang 28a was omitted and a perforated metal strip simply applied over the joint.

Figure 6:
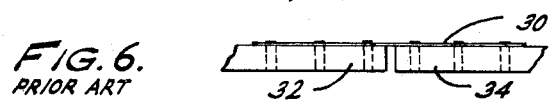
FIG. 6 is a similar fragmentary cross-sectional view showing a taped butt joint in accordance with the prior art.

An improvement over the arrangement of FIG. 5 for reasons enumerated, was the printed polyvinyl chloride strip of the color of the panel finish, which bore black or gray dots in a distribution, size and color intensity to simulate the effect of holes in the panels which the strip was intended to cover. Such a strip, particularly with a precoating of adhesive, was more easily applied. It also was subject to becoming detached from some places along the joint. Such a joint is seen in FIG. 6 wherein tape 30 overlaps a plain flat butt joint between panels 32 and 34.

Figure 7:
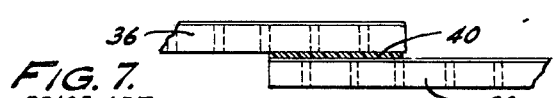
FIG. 7 is a fragmentary cross-sectional view showing a means intended to hide a lap joint.

FIG. 7 shows a solution to the problem of lap joints presenting a white stripe because the white of the paint of the lower panel shows through the perforations of the overlapping panel. As shown in FIG. 7, a black strip 40 is inserted between the lower panel 38 and the upper overlapping panel 36 so that white from the panel 38 is no longer visible through holes in panel 38.

Figure 8:
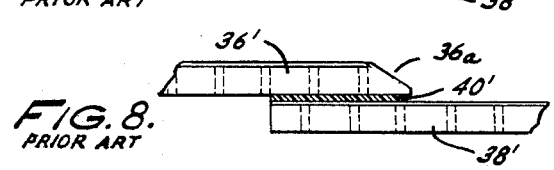
FIG. 8 is a view similar to FIG. 7 showing a tapered lap joint applied to prefinished panels in accordance with the prior art.

FIG. 8 illustrates how in the prior art the upper surface of the screen panel was chamfered at the edge to present less of a stepped discontinuity. The joint shown is similar to that of FIG. 7 and bears similar number designators with the addition of primes thereto. However, in chamfering panel 36' to form the chamfered surface 36a the precoated finish was cut away. Particularly if the prefinish were vinyl the repainting could not match, but even matching other paints for reflectivity as well as color has been a serious problem not to mention the tedious job of repainting.

Figure 9:
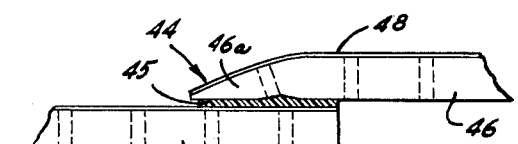
FIG. 9 is a view similar to FIGS. 7 and 8 showing the tapered lap joint in accordance with the present invention.

FIG. 9 shows the construction of the present invention in which a lower panel 42 is covered by a lap joint, generally designated 44 by an upper panel 46 having an edge portion 46a that is tapered from the generally uniform thickness of the panel to a substantially thinner cross section at the terminus or free edge. The width of the tapered portion 46a along the edge of the panel is small compared to the full width of the panel. The prefinished surface is continuous and uniform and extends over the entire panel including the tapered edge portion. If desired, a black strip 45 may be provided between the overlapping edge portions of panels 42 and 46 as shown. The panels, such as panel 46, are preferably fabricated from a material that easily is set, upon deformation beyond its elastic limit, such as a soft aluminum. The thickness of a panel, such as 46, is in the range of 0.030–0.040 inches and the vinyl covering 48 is about 6–10 mils. The feathered edge of panel 46 at the terminus or free edge is reduced to about no more than 0.010 inches by the chamfering.

Figure 10A:
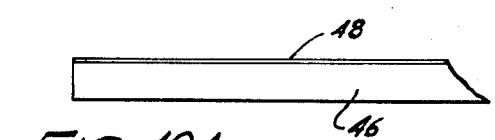
FIGS. 10A through 10D are schematic drawings showing steps of a method of forming a joint in accordance with the present invention.
Figure 10B:
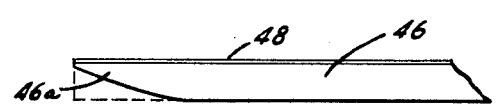
Figure 10C:
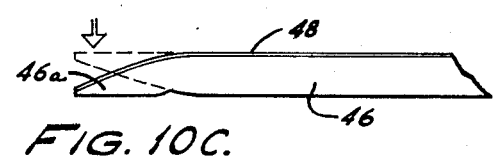
Figure 10D:
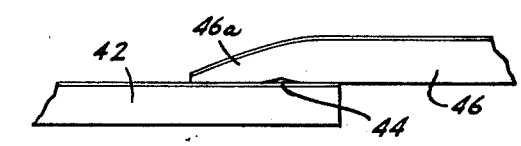
Figure 11A:
Figure 11B:
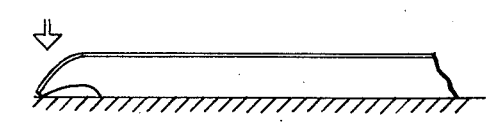
Figure 12A:
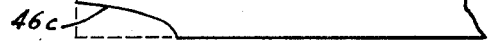
Figure 12B:
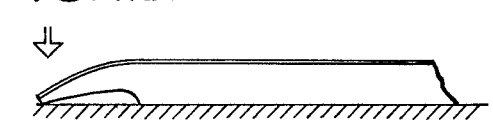
Figure 13A:
Figure 13B:
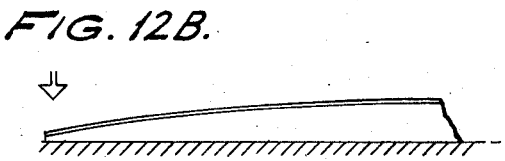
Figure 14A:
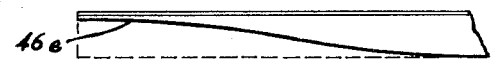
Figure 14B:
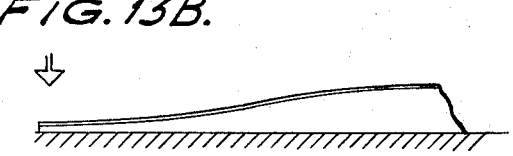

FIGS. 10A, 10B, 10C and 10D show the steps of a preferred method of preparing the lap joint 44 by chamfering the edge portion 46a panel 46. As seen in FIG. 10 the panel 46 is precoated with a layer of white or other reflective material 48, which may be a laminate of polyvinyl chloride. As seen in FIG. 10B the edge of the panel has been chamfered or cut away on a bevel along the entire edge, as may be achieved through use of a milling machine or the like. The portion cut away is on the back side, or face opposite that which has been prefinished so that the prefinished surface is not damaged. Thereafter, as shown in FIG. 10C the tapered, or chamfered, edge portion is deformed, as shown diagrammatically by the arrow, by pressing it away from the prefinished surface into a fixed surface conforming in shape to the abutting surface of the lower panel 42 of the intended joint. The edge is deformed or bent to fair into and lay against the surface of panel 42 with which it forms the joint as shown in FIG. 10D.

FIGS. 11A, 12A, 13A and 14A show different forms of chamfering by way of illustrating the variety of which may be employed within the scope of the invention. The types of chamfering shown include: a relatively steep straight line bevel 46b shown in FIG. 11A; a bevel with a rounded curve distal from the terminus and feathering toward the terminus to give a generally parabolic effect as shown at 46c in FIG. 12A; an elongated, relatively shallow slope bevel such as at 46d in FIG. 13A; and a reverse curve, or lazy S, bevel that feathers to the terminus, such as shown at 46e in FIG. 14A.

FIGS. 11B, 12B, 13B and 14B show the corresponding pieces after each has been deformed into its final shape. The shapes which the finished edge will assume after deformation will be apparent to those skilled in the art. Deformation occurs only in response to pressure applied in the direction shown schematically by the arrows in the respective figures. The manner in which the pressure is applied, as well as the form of the chamfered undercut, will determine the shape of the finished piece. Whether or not a void is left on the underside of the edge is not as important as the shape of the portion on the bottom adjacent to the substantially thinned termination of the edge. The edge desirably should appear to fair into, or merge with, the surface of the adjacent panel but this need not be a difficult requirement since panel forms have been shaped in the past so that overlapping panels will fit very well against the panel which they overlap and appear to fair to the surface throughout its length without causing gaps. The purpose of the deformation of the chamfered edge portion is to restore this condition to the thinned panel edge so that there will not be visible gaps between the edge and the panel which it overlaps. Thus, the deformation must be against a mold or form which effectively conforms the bottom of the panel generally as indicated. The deforming pressure may be applied by pressing the edge against such a form in one operation as in a press or it may be formed by rolling the edge, for example, by a rubber or other deformable roller which will form it into the desired shape.

The present invention has been described in terms of techniques and materials used in the past. There is no intention to limit the present invention to such techniques and materials and the invention is intended to be applicable using any techniques and materials with which it can be employed within the scope of the appended claims. The claims should, of course, be given the broadest interpretation to which they are properly susceptible in light of prior art.

I claim:

1. A construction for a projection screen employing lap joints between adjacent, prefinished, upper and lower, non-intersecting panels each having a continuous one-piece reflective vinyl finish suitable for projection of light over the entirety thereof, the upper panel at each top joint being initially of generally uniform thickness and of such size as to provide a portion that will overlap at least one adjacent lower panel, the overlap portion of the upper panel lying in the plane defined by said thickness of the panel, the overlap portion of the upper panel rearwardly of said continuous reflective finish having a taper along at least the one edge intended to overlap an adjacent panel, whereby the thickness of said upper panel at the very edge is substantially reduced and tapers from said uniform thickness to the edge in a relatively short distance, and the tapered edge being deformed so that it will conform to and substantially lay against the lower panel it is intended to overlap without destroying the continuous character of the reflective finish, with the deformed tapered edge of the upper panel and the lower panel being located in adjacent non-intersecting planes, whereby the edge of the upper panel has a minimal effect upon light directed from any angle upon the screen in which said upper and lower panels are employed.

2. The construction of claim 1 in which the taper is uniform providing an essentially wedge-shaped cross-section.

3. The construction of claim 1 in which the taper is non-linear, beginning gradually and thinning the cross-section more rapidly toward the edge.

4. The construction of claim 1 in which the taper is compound in shape.

5. The construction of claim 1 in which the continuous reflective vinyl finish is provided by a uniform layer of vinyl laminated to a substructure, during the process of making the panel and before the panels are cut to size and shaped.

6. In a projection screen, employing an elongated lap joint between a panel, having a reflective face, and an adjacent reflective surface, wherein an elongated edge portion of the panel overlies the adjacent reflective surface with the panel and reflective surface lying in adjacent, non-intersecting planes, the improvement in construction, whereby said overlapping edge of the panel is to produce a minimal effect upon the reflection of light directed from any angle upon the reflecting faces of the panel and adjacent surface that together define a portion of the projection screen, comprising said panel including a substrate sheet of a material that is deformable and easily set upon deformation beyond the material's elastic limit a prefinished continuous face of reflective material being provided on said substrate sheet prior to deformation of the substrate sheet, the portion of the panel that overlaps the adjacent reflective surface being shaped and arranged and deformed, without destroying the continuous character of the prefinished reflective face on the panel, to have said prefinished continuous face of reflective material at the edge terminus of the panel terminate adjacent the said adjacent reflective surface, with the thickness of the panel adjacent said edge terminus being lessened resulting in a surface on the rear of the panel that lies adjacent said adjacent reflective surface, thereby reducing to a minimum the discontinuity between said reflective faces of the panel and adjacent surface.

7. In a projection screen, employing an elongated lap joint between a panel having a reflective face and an adjacent reflective surface, the panel and adjacent reflective surface being disposed in adjacent planes that do not intersect, and wherein an elongated edge portion of the panel that is located only within the plane of the panel overlies the adjacent reflective surface, the improvement in construction, whereby said overlapping edge of the panel is to produce a minimal effect upon the reflection of light directed from any angle upon the reflecting faces of the panel and adjacent surface that together define a portion of the projection screen, comprising said panel including a substrate sheet of a material that is deformable and easily set upon deformation beyond the material's elastic limit, a prefinished continuous laminate face of reflective material on said substrate sheet, the portion of said substrate, that is opposite the reflective face of the panel and is located at the region adjacent the elongated overlapping edge of the panel, being chamfered to reduce the thickness of said substrate sheet at said overlapping edge, said chamfered portion of substrate and face of reflective material being deformed, without destroying the continuous character of the prefinished laminate reflective face and in a direction toward the plane of the adjacent overlapped reflective surface and to a position within the plane of the panel at which the material of the substrate sheet becomes set with said chamfered face of said edge portion lying substantially adjacent the adjacent reflective surface, thereby reducing to a minimum the discontinuity between said reflective faces of the panel and adjacent surface.

8. A construction as in claim 7 wherein the face of reflective material on the panel is a continuous flexible sheet of material that covers the entire substrate.

9. A construction as in claim 7 wherein the face of reflective material is a vinyl covering of about 6–10 mils thickness laminated to the substrate.

10. A construction as in claim 7 wherein the entire substrate initially is of generally uniform thickness and is a sheet of soft aluminum whose thickness is in the range of 0.030–0.040 inches.

11. A construction as in claim 10 wherein the thickness at the edge terminus of the panel, after being reduced by chamfering, is about no more than 0.010 inches.

* * * * *